(12) United States Patent
Yoshida et al.

(10) Patent No.: US 6,182,801 B1
(45) Date of Patent: Feb. 6, 2001

(54) DISC BRAKE DEVICE

(75) Inventors: Hirokazu Yoshida; Kazuyuki Shibayama; Seiya Odaka, all of Tokyo (JP)

(73) Assignee: Akebono Brake Industry Co., Ltd., Tokyo (JP)

( * ) Notice: Under 35 U.S.C. 154(b), the term of this patent shall be extended for 0 days.

(21) Appl. No.: 09/077,538

(22) PCT Filed: Oct. 1, 1997

(86) PCT No.: PCT/JP97/03507

§ 371 Date: Jun. 1, 1998

§ 102(e) Date: Jun. 1, 1998

(87) PCT Pub. No.: WO98/14714

PCT Pub. Date: Apr. 9, 1998

(30) Foreign Application Priority Data

Oct. 1, 1996 (JP) .................................................... 8-280060

(51) Int. Cl.$^7$ ...................... F16D 55/224; F16D 65/092; F16D 65/095

(52) U.S. Cl. .................................. 188/73.45; 188/73.31; 188/73.1; 188/73.35

(58) Field of Search ............................ 188/73.44, 73.45, 188/73.1, 73.35–73.38, 234, 73.31, 71.1, 250 B, 250 G, 250 E

(56) References Cited

U.S. PATENT DOCUMENTS

| | | | |
|---|---|---|---|
| 4,121,699 | * | 10/1978 | Tsuruta et al. .................... 188/73.1 |
| 5,129,487 | * | 7/1992 | Kobayashi et al. ................ 188/73.1 |
| 5,890,566 | * | 4/1999 | Yoshida et al. .................... 188/73.1 |
| 5,931,267 | * | 8/1999 | Iwata et al. ....................... 188/73.45 |

FOREIGN PATENT DOCUMENTS

| | | |
|---|---|---|
| 55-122542 | 8/1980 | (JP) . |
| 62-130233 | 8/1987 | (JP) . |
| 64-21824 | 2/1989 | (JP) . |
| 6-503636 | 4/1994 | (JP) . |
| 9-250572 | 9/1997 | (JP) . |
| 9814714 | * 4/1998 | (WO) . |

* cited by examiner

*Primary Examiner*—Douglas C. Butler
(74) *Attorney, Agent, or Firm*—Morgan, Lewis & Bockius LLP

(57) ABSTRACT

In the pushing anchor type disc brake device, reduction of noise and prevention of uneven wear can be accomplished especially in the brake device in which brake torque of the outer pad is transmitted via the caliper. In the disc brake device, the caliper is guided by a pair of guide pins composed of a main pin and a sub-pin. In order to transmit the brake torque of the outer pad via the caliper and the main pin, the back plate of the outer pad and the caliper are engaged with each other by engaging a protrusion with a recess, wherein the engagement is conducted at a plurality of portions in the circumferential direction of the rotor, so that the brake torque can be transmitted from the outer pad to the caliper. The main pin is arranged on the rotor run-out side, so that a pushing anchor structure can be formed. A pair of guide pins and guide holes of the support member which engage with the pair of guide pins stride the rotor and extend exceeding a facing section where the rotor faces the outer pad. The main pin is arranged on the rotor run-out side. Brake torque on the outer pad side is transmitted by the protrusion and recess engaging section arranged on the rotor run-out side.

11 Claims, 2 Drawing Sheets

DISC BRAKE DEVICE

TECHNICAL FIELD

The present invention relates to a disc brake device and, more particularly to a disc brake device in which a brake torque applied to an outer pad is supported by a vehicle body through a caliper.

DESCRIPTION OF THE PRIOR ART

Conventionally, there is known a disc brake device in which a brake torque applied to an outer pad is supported by a vehicle body through a caliper, and a brake torque applied to an. inner pad is supported by a support member. This disc brake is composed as follows. There is provided a caliper striding a rotor. This caliper is held by a pair of guide pins, so that the caliper can be moved in the axial direction of the rotor. In this case, the pair of guide pins are attached to the support member, which is fixed to the vehicle body, on the inner side, and these guide pins extend in a direction opposite to the rotor. The inner pad is pressed against the rotor by the action of a hydraulic cylinder provided on the inner side of the caliper, and at the same time, the caliper is moved by the reaction force, so that the outer pad can be pressed against the rotor by the action of a caliper claw on the outer side. In this case, the outer pad is combined with the caliper claw by the engagement of a protrusion with a recess, so that a brake torque of the outer pad can be transmitted to the caliper claw.

In the disc brake composed in the manner described above, brake torque is supported by the vehicle body as follows. Brake torque applied to the inner pad is supported by the support member, and brake torque applied to the outer pad is transmitted to a guide pin on the rotor run-in side through the caliper claw, so that the torque can be supported by the vehicle body. Due to the foregoing, a main guide pin of large diameter is conventionally arranged on the rotor run-in side, and a sub-guide pin of small diameter is arranged on the rotor run-out side. While the error caused in the process of manufacture is absorbed in this way, brake torque applied to the outer pad is supported by the main guide pin of large diameter. On the back plate of the outer pad, there is provided a protrusion which engages with a torque transmitting hole formed in the caliper claw as disclosed in Japanese Unexamined Utility Model Publication No. 62-130233.

However, in the disc brake composed as described above, the following problems may be encountered. The outer pad and the caliper are combined with each other by the engagement of a protrusion and a recess, however, in order to absorb an error caused in the process of manufacture, the outer diameter of the protrusion is determined to be smaller than the inner diameter of the recess. Due to the above structure, the outer pad tends to vibrate when the brake is applied. In the same manner, in order to move the caliper, to which the brake torque of the outer pad is transmitted, in the axial direction of the rotor, an arm extended from the side of the caliper is opposed to this support at a position on the vehicle body side, and a guide pin attached to the support member is inserted into the caliper arm. Accordingly, the guide pin is arranged in the inner side of the rotor, and the caliper supported by this guide pin holds the outer pad by the claw extended onto the outer side of the rotor.

Therefore, when brake torque is applied to the outer pad, noise is generated around the outer pad by the vibration of the side of the outer pad on which the surface pressure is low. In the same manner, when the brake is applied, an angular moment is generated round the main guide pin. Therefore, both the inner and the outer pads are not made to come into pressure-contact with the rotor in parallel with each other by the deformation of the overall caliper. Accordingly, there is caused a problem of uneven wear.

When brake torque is generated, the main guide pin supports the brake torque. In this case, although a rubber bush is attached to the sub-guide pin of small diameter, the sub-guide pin is deformed when the brake torque is applied. Accordingly, by the generation of the angular moment described above, the caliper and the support member are vibrated, and generate noise.

The present invention has been accomplished to solve the above problems. It is an object of the present invention to provide a disc brake device characterized in that: generation of noise is reduced when brake torque is supported by the main guide pin in the braking process and torque applied to the outer pad is precisely transmitted, so that vibration of the outer pad and caliper is suppressed; and generation of plane angular moment of the caliper is suppressed, so that uneven wear of the pad can be reduced.

SUMMARY OF THE INVENTION

In order to accomplish the above object, the present invention is to provide a disc brake device in which a caliper is guided with respect to a support member by a pair of guide pins including a main pin and a sub-pin, and a back plate of an outer pad and the caliper are engaged with each other by the engagement of a plurality of protrusions and recesses arranged in the circumferential direction of a rotor so that brake torque applied to the outer pad can be transmitted through the caliper and the main pin, wherein the pair of guide pins and guide holes of the support member into which the guide pins are inserted extend while they are striding the rotor, and exceed a facing portion where the rotor faces the outer pad, and the main pin is arranged on the rotor run-out side and brake torque applied to the outer pad is transmitted by a protrusion and recess engaging section arranged on the rotor run-out side.

In this case, a distance between the centers of the protrusions or recesses on the outer pad side in the protrusion and recess engaging section of the outer pad and the caliper is larger than a distance between the centers of the recesses or protrusions on the caliper side.

Since the main guide pin is arranged on the rotor run-out side, an amount of wear of the outer pad is larger on the rotor run-out side due to the torsional deformation of the caliper. Accordingly, the rotor run-out side of the outer pad tends to vibrate when a light load is given to the brake, however, in the present invention, the outer pad protrusion and recess engaging section on the rotor run-out side, which tends to vibrate, can support a torque by the above arrangement, so that the occurrence of vibration can be effectively suppressed and the effect of reducing noise can be enhanced.

In the case where brake torque is generated in the outer pad, brake torque is transmitted to the main guide pin arranged on the rotor run-out side through the caliper and further transmitted to the support member from the guide hole in which this main guide pin is accommodated. The main guide pin and the guide hole are so long that they stride the rotor and extend to a surface on which the outer pad and the rotor come into contact with each other. Due to the above arrangement, the point of application of brake torque in the axial direction of the rotor coincides with the support membering point, that is, no offset is provided. Therefore, even if torsional deformation is caused by braking in such a manner that the outer side of the caliper comes close to the main guide pin side, the overall surface of the main guide pin can support torque on the extension of a force acting on the outer pad by the rotor, and a force to generate an angular moment is suppressed. Due to the foregoing, the caliper can behave smoothly, and the generation of noise can be reduced and further the occurrence of uneven wear can be prevented.

DESCRIPTION OF THE PREFERRED EMBODIMENT

Referring to the accompanying drawings, an embodiment of the disc brake of the present invention will be explained in detail below.

Figure 1A:
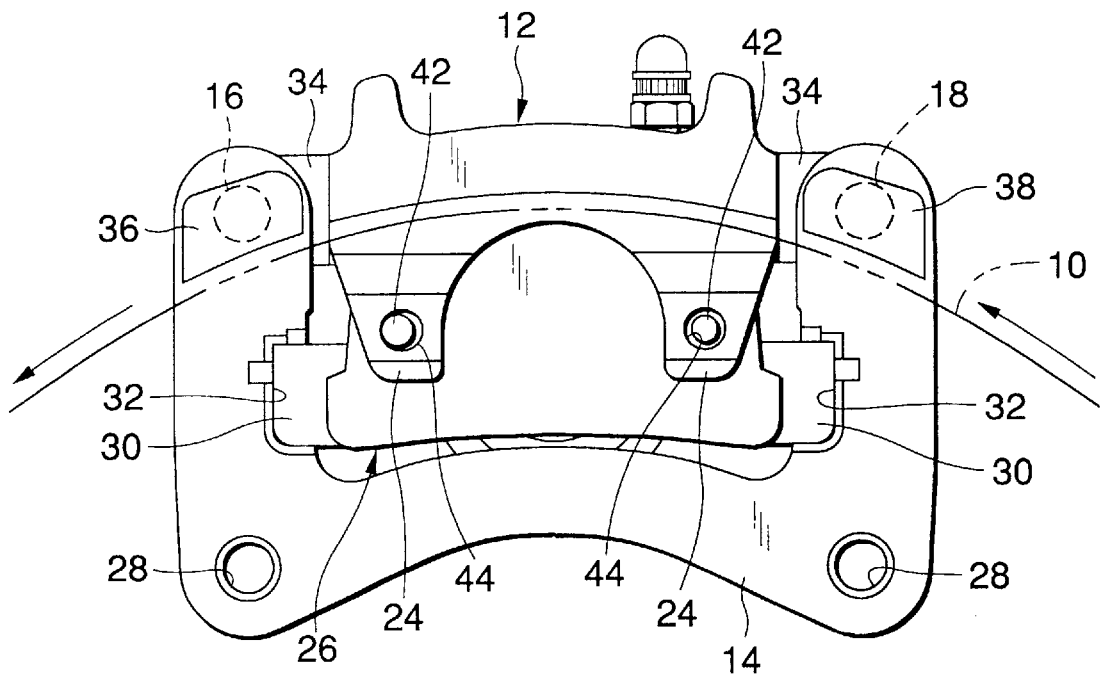
FIG. 1(a) is a front view of the disc brake device of the embodiment of the invention.

FIG. 1 is a view showing an arrangement of the disc brake device of the embodiment. In this disc brake device, there is provided a caliper 12 which strides a rotor 10. This caliper 12 is capable of moving with respect to the support member 14, which is attached to a vehicle body, in the axial direction of the rotor via a pair of guide pins 16, 18 which are arranged in parallel with each other and compose a sliding guide mechanism. There is provided a hydraulic cylinder 20 on the inner side of the caliper 12. By the hydraulic cylinder 20, it is possible to press the inner pad 22 against the rotor 10. When the caliper 12 is moved by a reaction force of the inner pad 22, an outer pad 26 can be pressed against the rotor 10 by a caliper claw 24 provided on the outer side.

The support member 14 is arranged in such a manner that it faces the inner surface of the rotor 10. The support member 14 is fixed to the vehicle body by tapped holes 28 at a position closer to the rotor center than the attaching positions of the guide pins 16, 18. The attaching positions of the guide pins 16, 18 are located outside the periphery of the rotor 10. An inner pad 22 is attached to the support member 14 in such a manner that the inner pad 22 can be moved in the axial direction of the rotor. Therefore, braking torque can be supported by the support member 14. There are provided anchor protrusions 30 on both side edges of the inner pad 22, and in a portion corresponding to the support member 14 there are provided anchor recess grooves 32 along the axial direction of the rotor, and these anchor recess grooves 32 function as a braking anchor section. By the above arrangement, the braking torque can be supported. When the hydraulic cylinder 20 of the caliper 12 is operated, the inner pad 22 is moved while it is guided by the anchor recess grooves 32, so that the inner pad 22 is pressed against the rotor 10. Therefore, when the inner pad 22 attempts to rotate while it follows the rotation of the rotor 10, the anchor recess grooves 32 receive the brake torque.

As described above, in this example, the caliper 12 is guided by the guide pins 16, 18. As shown in FIG. 1, this guide mechanism is composed of a main guide pin 16 of large diameter arranged on the rotor run-out side, and a sub-guide pin 18 of small diameter arranged on the rotor run-in side. These guide pins 16, 18 are attached to the caliper 12. On the inner side of the caliper 12, there are provided caliper arms 34 which extend to the right and left, that is, in the direction along the rotor surface. The guide pins 16, 18 are perpendicularly fastened and fixed to the caliper arms 34. In this example, lengths of the guide pins 16, 18 are determined as follows. Head portions of both guide pines 16, 18 are fixed to the caliper arms 34 and inserted into the support member 14. The guide pins 16, 18 extend to the outer side while they stride the rotor 10. The head portions of the guide pins reach a contact surface on which the rotor 10 comes into contact with the outer pad 26.

In the support member 14 into which these guide pins 16, 18 are inserted, there are provided sliding sleeves 36, 38 in which the pin sliding guide holes are formed. The main sliding sleeve 36 accommodating the main guide pin 16 arranged on the rotor run-out side engages with the main guide pin 16 within a predetermined tolerance, so that the main sliding sleeve 36 slidably guides the main guide pin 16. Although brake torque given by the outer pad 26 is transmitted to the guide pin 16 via the caliper 12, it is supported by the support member 14 via the sliding inner surface of the main sliding sleeve 36. A brake torque supporting surface of the main sliding sleeve 36 is a half portion of the main sliding sleeve 36 on the rotor run-out side which is opposed to an extending portion of the main guide pin 16. On the other hand, in the support member 14, there is provided a sub-sliding sleeve 38 in which the sub-guide pin 18 arranged on the rotor run-in side is accommodated while play is formed in the radial direction. In this connection, dust-proof and water-proof rubber boots 40 are attached to the neck portions of the guide pins 16, 18 which are exposed from the opening portions of the sliding sleeves 36, 38.

By a reaction force generated by the inner pad 22, the caliper 12 is moved to the inner side in the axial direction of the rotor while the caliper 12 is guided by the guide pins 16, 18. Due to the foregoing, the outer pad 26 is pressed against the outer surface of the rotor 10 by the caliper claw 24. Brake torque applied to the outer pad 26 is transmitted to the caliper 12. For this reason, there are provided protrusions 42 for engaging with the caliper on the back of the outer pad 26. In the caliper claw 24, there are provided engaging recesses 44 which are engaged with the caliper engaging protrusions 42 so that brake torque can be transmitted. In this embodiment, the caliper claw 24 forks off into two branches, and each claw 24 engages with the protrusion 42 for engaging with the caliper. Accordingly, when the outer pad 26 is pressed against the rotor 10 and a brake torque is generated, this brake torque is transmitted to the caliper 12 via the protrusions 42 for engaging with the caliper and further supported by the support member 14 via the main guide pin 16 arranged on the rotor run-out side.

Figure 1B:
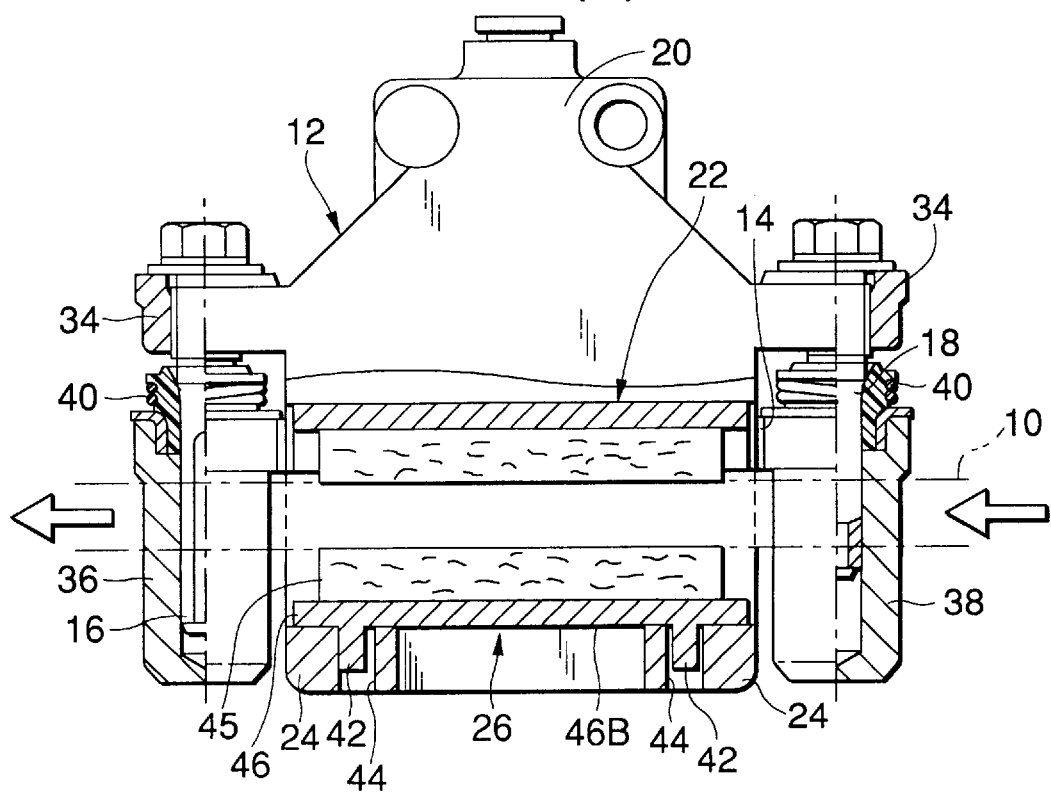
FIG. 1(b) is a partially cross-sectional view of the disc brake device of the embodiment of the invention.

In this disc brake device, the outer pad 26, which is pressed against the rotor 10 by the caliper claw 24, is composed as follows. As shown in FIG. 1(b), the outer pad 26 is composed of a lining 26 and a back plate 46. As described before, on the back 46B of the back plate 46, there are provided protrusions 42, 42 for engaging with the caliper which are fitted to the engaging recesses 44 formed in the forked caliper claw 24. This protrusion 42 for engaging with the caliper is formed in such a manner that a punch is pushed from the lining attaching side of the back plate 46, so that deep drawing can be conducted in a metallic die arranged on the back side in which a hole corresponding to the protrusion is formed.

Figure 2:
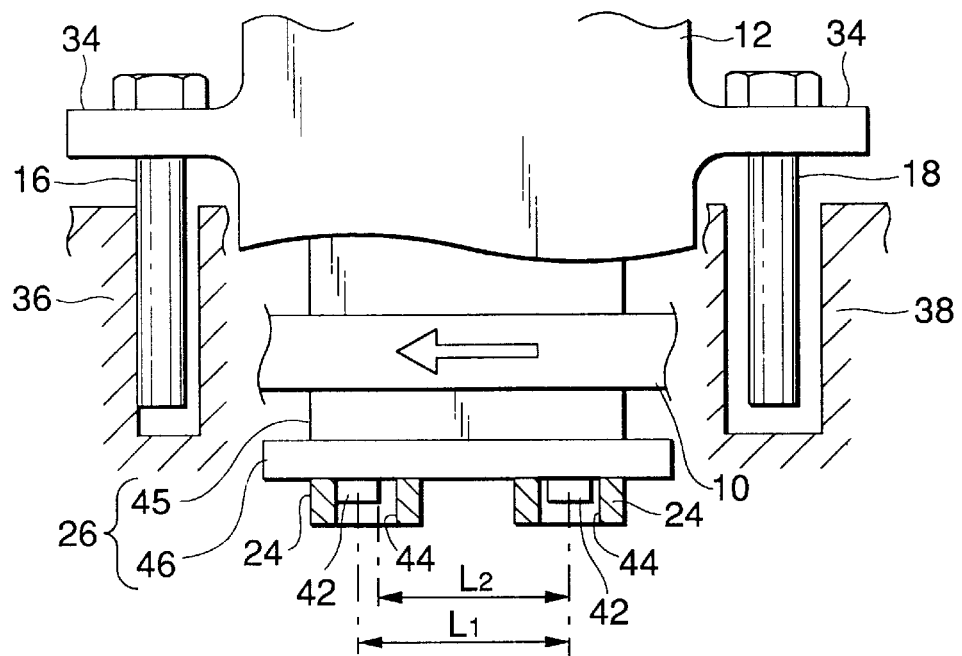
FIG. 2 is a cross-sectional schematic illustration for explaining the action of the brake device.

The protrusions 42 for engaging with the caliper composed as described above protrude from the back of the back plate 46 and engage with the engaging recesses 44 formed in the caliper claw 24. In order to positively engage the outer pad 26 with the caliper claw 24, the equivalent diameter of the engaging recess 44 is determined to be larger than the equivalent diameter of the protrusion 42. Accordingly, there is a clearance in the engaging section. In this embodiment, the structure of which is described above, in the engaging section of the outer pad 26 and the caliper claw 24, a distance between the centers of the protrusions 42, 42 for engaging the caliper arranged in the outer pad 26 is larger than a distance between the centers of the engaging recesses 44, 44 formed in the caliper claw 24. That is, as shown in the schematic illustration of FIG. 2, L1 is a distance between the centers of a pair of protrusions 42, 43 for engaging the caliper of the outer pad 26 arranged in the rotational direction of the rotor 10, and L2 is a distance between the centers of a pair of engaging recesses 44 formed in the caliper claw 24. In this case, dimensions are determined so that an inequality of L1>L2 can be satisfied. Therefore, brake torque on the outer pad 26 side is transmitted by the protrusion and recess engaging section located on the rotor run-out side in which the main guide pin 16 is arranged.

In this embodiment composed as described above, when the inner pad 22 is pressed against the rotor 10 in braking operation, the outer pad 26 is pressed against the rotor 10 by the action of the caliper 12 in which the reaction force is generated. Brake torque of the inner pad 22 is directly supported by the support member 14, and brake torque of the outer pad 26 is transmitted to the main guide pin 16 arranged on the rotor run-out side via the caliper claw 24. Therefore, torque is transmitted to the support member by an end portion of the main guide pin 16. In this case, the maximum torque is received on the extension of the contact surface of the outer pad 26 and the rotor surface.

In this embodiment, brake torque on the outer pad 26 side is transmitted by the protrusion and recess engaging section located on the rotor run-out side on which the main guide pin 16 is arranged. In the pushing anchor type disc brake device in which the main guide pin 16 is arranged on the rotor run-out side, the caliper 12 is deformed when torque is transmitted from the outer pad 26 in the process of braking, that is, the outer caliper portion is deformed in such a manner that it comes close to the main guide pin 16. In the case where the lining on the rotor run-out side wears away, when braking operation is changed from a high load operating state to a low load operating state, an end portion of the outer pad 26 on the rotor run-out side tends to vibrate. However, according to this embodiment, the end portion of the outer pad 26 on the rotor run-out side is restricted by the protrusion and recess engaging section. Therefore, it is possible to reduce the generation of noise around the outer pad 26.

The following table shows examples in which the noise reduction was confirmed. On the following table, the results of tests are shown in which disc brakes of different sizes were tested. The ratio of noise generation represents a ratio (%) of noise generation in which noise, the sound pressure of which is not lower than 70 dB, is generated with respect to the total frequency of braking operation.

TABLE 1

| Specification | | Main guide pin | Position of torque transmitting protrusion and recess engaging section | Ratio of noise generation |
|---|---|---|---|---|
| 1 | Comparative Example 1 | Rotor run-out side | Rotor run-in side | 091% |
| | Inventive Example 1 | Rotor run-out side | Rotor run-out side | 027% |
| 2 | Comparative Example 2 | Rotor run-out side | Rotor run-in side | 256% |
| | Inventive Example 2 | Rotor run-out side | Rotor run-out side | 004% |

As described above, in this embodiment, the main guide pin 16 is arranged on the rotor run-out side. In the protrusions 42 for engaging with the caliper of the outer pad 26 arranged in the rotational direction of the rotor 10, and in the engaging recesses 44 of the caliper claw 24 which are engaged with the protrusions 42 for engaging with the caliper, the protrusion 42 for engaging with the caliper located on the rotor run-out side and the engaging recess 44 receive the brake torque on the outer pad side 26. Due to the above arrangement, it is possible to suppress vibration of the end portion on the rotor run-out side of the outer pad 26 which tends to vibrate in the process of braking operation. In this way, it is possible to provide the noise suppression effect around the outer pad 26. In the embodiment, in addition to the above structure, a force acting on the main guide pin 16 is received on an extension of the force acting on the outer pad 26 by the rotor 10. Therefore, a force to turn the caliper 12 is suppressed. While the length of the main guide pin 16 is extended so that it exceeds the outer surface of the rotor 10, the guide pins 16, 18 are arranged outside the braking center of the outer pad 26 in the radial direction of the rotor. Due to the above arrangement, the sub-guide pin 18 of small diameter is pressed against the sleeve round the main guide pin 16. Therefore, it is possible to suppress the vibration of a portion in which play is formed. As described above, the noise suppression effect of the disc brake device of this embodiment is very high. In addition to that, the above arrangement is advantageous in that it is possible to prevent the occurrence of uneven wear of the pads 22, 26.

Figure 3:
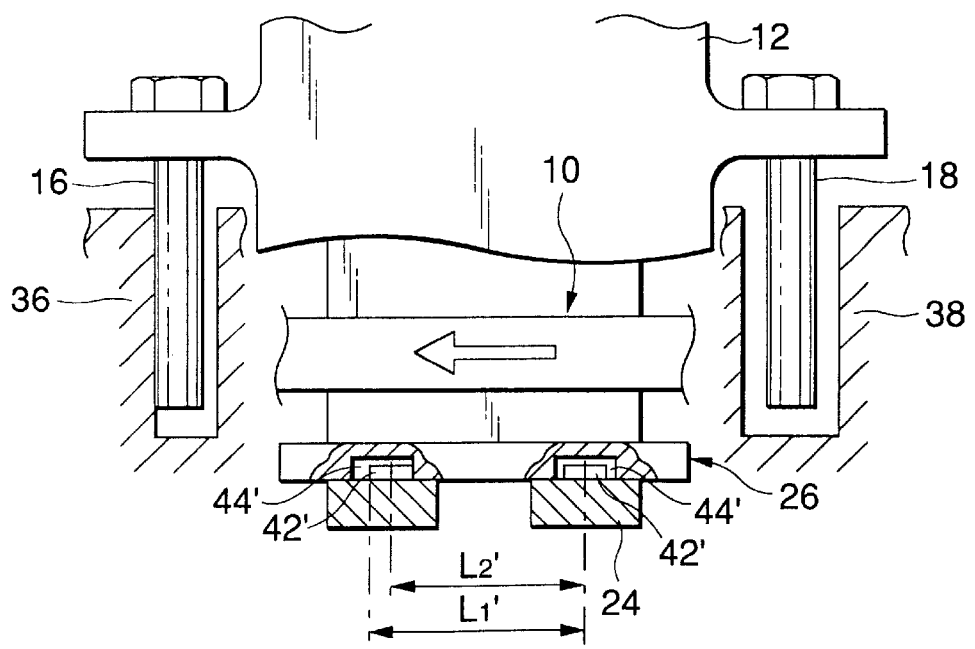
FIG. 3 is a cross-sectional schematic illustration of the brake device of another embodiment.

FIG. 3 is a view showing another embodiment. In this embodiment, a relation between the protrusion and the recess in the engagement of the outer pad 26 with the caliper claw 24 is reversed with respect to the relation between the protrusion and the recess of the embodiment described above. That is, the recesses 44' are formed in the back plate of the outer pad 26, and the protrusions 42' are formed in the caliper claw 24. In this case, distance L1' between the centers of a pair of recesses 44' is set to be larger than distance L2' between the centers of the protrusions 42', so that the outer pad brake torque may be supported in the protrusion and recess engaging section on the same Rotor run-out side as that of the main guide pin 16 which acts as an anchor while it is located on the rotor run-out side. In this case, it is possible to provide the same action as that of the above embodiment.

In this connection, in the above example, brake torque on the outer pad 26 side is received on the rotor run-out side while the main pin is arranged on the rotor run-out side in accordance with a relation of size between the pitch of the protrusions 42 (42') of the same diameter and the pitch of the recesses 44 (44') of the same diameter. However, it is possible to transmit the brake torque on the outer pad 26 side by the protrusion and recess engaging section on the rotor run-out side in accordance with a relation of size of the protrusions 42 or a relation of size of the recesses 44.

As explained above, the present invention provides a disc brake device in which a caliper is guided with respect to a support member by a pair of guide pins including a main pin and a sub-pin, and a back plate of an outer pad and the caliper are engaged with each other by the engagement of a plurality of protrusions and recesses arranged in the circumferential direction of a rotor so that brake torque applied to the outer pad can be transmitted through the caliper and the main pin, wherein the pair of guide pins and guide holes of the support member into which the guide pins are inserted extend while they are striding the rotor, and exceed a facing portion where the rotor faces the outer pad, and the main pin is arranged on the rotor run-out side and brake torque applied to the outer pad is transmitted by a protrusion and recess engaging section arranged on the rotor run-out side. Accordingly, the outer pad protrusion and recess engaging section on the rotor run-out side, which tends to vibrate in the pushing anchor type disc brake device, supports the brake torque on the outer side. Accordingly, vibration of the brake device can be effectively suppressed, and generation of noise can be greatly reduced.

What is claimed is:

1. A disc brake for engaging a rotor, comprising:

a support member defining a pair of guide sleeves;

a caliper moveable with respect to the support member;

a main guide pin and a sub-guide pin attached to the caliper and inserted into respective ones of the guide sleeves to guide the caliper with respect to the support member;

an outer pad having a back plate, the back plate in contact with the caliper; and first and second protrusions defined in a surface of one of the caliper and the back plate to respectively engage first and second recesses defined in a surface of the other one of the caliper and the back plate, the first protrusion and the first recess being disposed on a run-out side of the disc brake, wherein a brake torque applied to the outer pad is transmitted by the first protrusion and the first recess, wherein the main guide pin, the sub-guide pin, and the guide sleeves are astride the rotor such that portions of each of the main guide pin, the sub-guide pin and the guide sleeves each cross a plane defined by a surface of the rotor facing the outer pad, and wherein a contact portion of the main guide pin in contact with the respective one of the guide sleeves is astride the rotor such that the contact portion crosses the plane defined by the surface of the rotor facing the outer pad.

2. The disc brake according to claim 1, wherein the first and second protrusions are defined on the back plate and the recesses are defined on the caliper such that a distance between centers of the protrusions is greater than a distance between centers of the recesses.

3. The disc brake according to claim 2, wherein a diameter of the first and second recesses are respectively larger than a diameter of the first and second protrusions.

4. The disc brake device according to claim 1, wherein the protrusions are defined on the caliper and the recesses are defined on the back plate such that a distance between centers of the recesses is greater than a distance between centers of the protrusions.

5. The disc brake according to claim 4, wherein a diameter of the first and second recesses are respectively larger than a diameter of the first and second protrusions.

6. The disc brake according to claim 4, wherein the first protrusion and the first recess are disposed on a run-out side of the disc brake, a brake torque applied to the outer pad being transmitted by the first protrusion and the first recess.

7. The disc brake according to claim 1, wherein the main guide pin and the sub-guide pin are disposed outside the periphery of the rotor.

8. The disc brake according to claim 1, wherein the main guide pin and the sub-guide pin are striding the rotor.

9. The disc brake according to claim 1, wherein the main guide pin and the sub-guide pin extend across a plane defined by the rotor.

10. The disc brake according to claim 1, wherein the main guide pin is disposed on a run-out side of the disc brake and the sub-guide pin is disposed on a run-in side of the disc brake.

11. The disc brake according to claim 1, wherein the main guide pin and the sub-guide pin extend in a direction perpendicular to the rotor.

* * * * *